Sept. 30, 1924.  1,510,422
C. H. STEINBRECHER
LUBRICATING DEVICE
Filed Jan. 13, 1922
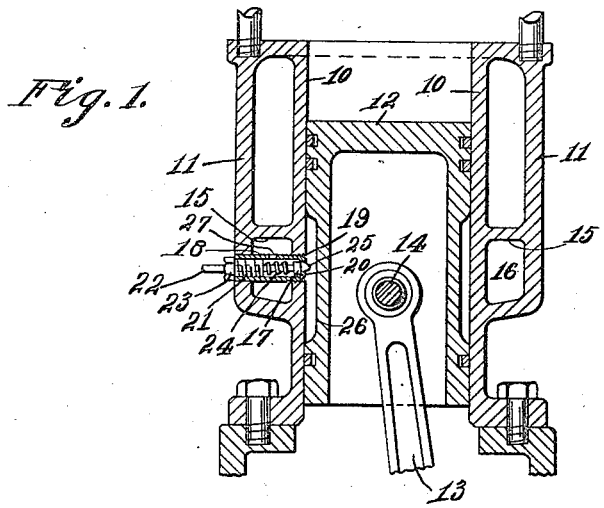
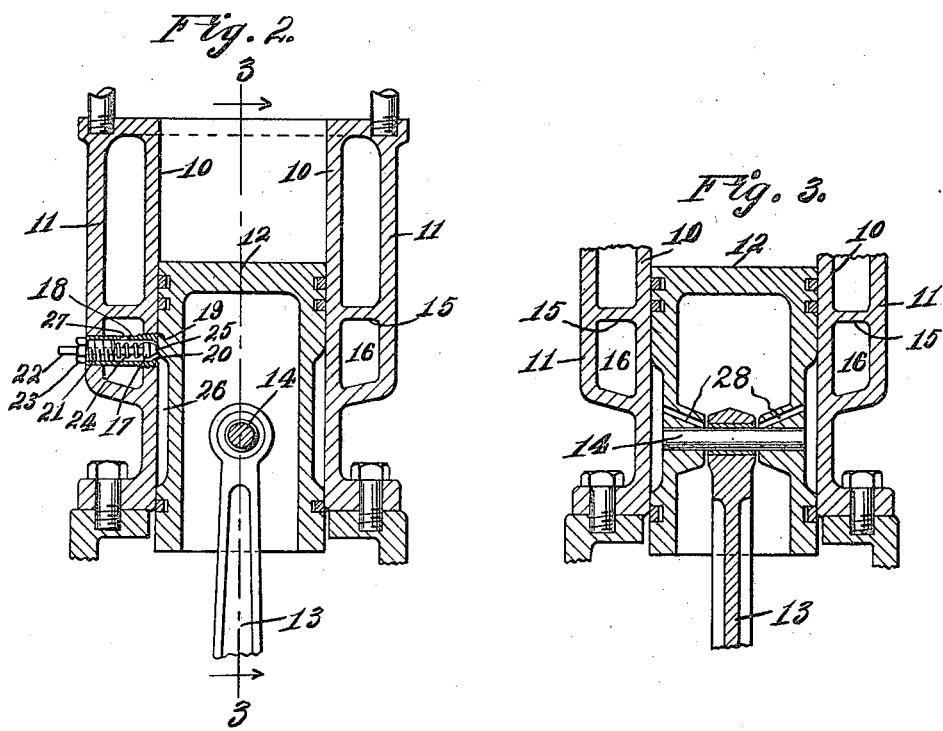
Clemens H. Steinbrecher
INVENTOR
BY Victor J. Evans
ATTORNEY
WITNESS:

Patented Sept. 30, 1924.

1,510,422

UNITED STATES PATENT OFFICE.

CLEMENS H. STEINBRECHER, OF QUINCY, ILLINOIS.

LUBRICATING DEVICE.

Application filed January 13, 1922. Serial No. 528,904.

*To all whom it may concern:*

Be it known that I, CLEMENS H. STEINBRECHER, a citizen of the United States, residing at Quincy, in the county of Adams and State of Illinois, have invented new and useful Improvements in Lubricating Devices, of which the following is a specification.

This invention relates to improvements in lubricating devices and has for an object the provision of means whereby the piston and wrist pin of an engine, compressor or the like, may be properly lubricated.

Another object of the invention is the provision of a device of the above character, which may be adjusted to furnish a predetermined quantity of lubricant, regulated by the speed of operation of the piston.

Another object of the invention is the provision of a lubricating device which is simple in construction, positive in operation and which will economically and accurately operate to furnish a proper amount of lubricant and thus reduce carbonization in internal combustion engines and insure a more perfect operation.

With the above and other objects in view, the invention further includes the following novel features and details of construction, to be hereinafter more fully described, illustrated in the accompanying drawings and pointed out in the appended claims.

In the drawings:—

Figure 1 is a vertical sectional view through a portion of an internal combustion engine with the invention applied thereto.

Figure 2 is a similar view showing the engine piston at the limit of its inward stroke.

Figure 3 is a detail sectional view on the line 3—3 of Figure 2.

Referring in detail to the drawings, wherein like characters of reference denote corresponding parts, the reference character 10 indicates the cylinder of an internal combustion engine, which is surrounded by a water jacket 11, which is usual in engines of this character. Operating within the cylinder 10 is a piston 12, which has connected thereto one end of a connecting rod 13, the wrist pin through which this connection is effected, being indicated at 14.

The water jacket 11 of the engine in the present instance is divided by a partition 15, so as to provide an oil reservoir 16, which is adapted to supply oil or similar lubricant to the engine cylinder for the purpose of insuring proper operation of the piston. It is of course understood that the source of lubricant supply may consist of other suitable means, such as a direct splash from the crank case of the engine, or various other means.

The passage of lubricant from the reservoir 16 to the cylinder is controlled through the medium of a valve 17. This valve operates within a housing 18, which is preferably cylindrical in shape and has its inner end threadedly engaging an opening 19, formed in the wall of the cylinder 10. The inner end of the casing 18 is open and this opening is surrounded by a valve seat 20. The opposite end of the casing 18 extends through the wall of the reservoir 16 and is internally threaded for engagement with an externally threaded sleeve 21. The valve 17 is provided with a stem 22 which projects through the sleeve 21 and is provided with a nut 23 which forms a stop. The stem 22 is surrounded between the valve 17 and sleeve 21 by a coiled spring 24 which acts to hold the valve normally seated. The valve 17 is provided with an extension 25 which projects into the cylinder 10 and is adapted to be engaged by the piston 12.

For this purpose the piston is surrounded by an annular groove or depression 26, whose upper edge forms a shoulder which is adapted to engage the extension 25 of the valve 17 as the cylinder reaches the limit of its inward stroke. This forces the valve from its seat and permits lubricant to pass into the cylinder through an opening 27 provided in the valve casing 18. As soon as the piston releases the valve on its upward stroke, the said valve will be automatically closed under the pressure of the spring and the flow of lubricant stopped.

By reason of the threaded engagement of the sleeve 21 with the valve casing 18, the tension of the spring 24 may be adjusted so that the amount of lubricant passing into the cylinder may be regulated through the regulation of the speed of action of the valve. This amount will perfectly lubricate the cylinder either at low, high or intermediate speeds, for example, at low speed the valve is in contact with the piston for a greater length of time and as the speed increases, the contact time will be lessened.

The wrist pin 14 is lubricated by providing two holes 28, one upon each side of the wrist pin and lubricant will thus flow from the lubricant depression 26 through these holes to the pin so as to insure proper lubrication of the latter.

The invention is susceptible of various changes in its form, proportions and minor details of construction and the right is herein reserved to make such changes as properly fall within the scope of the appended claims.

Having described the invention what is claimed is:—

1. The combination with a cylinder and a piston operating therein, of a lubricant reservoir, a valve casing extending across the oil reservoir having one end secured within an opening provided in the cylinder, said casing also having an opening therein for communication with the reservoir, a valve seat at the inner end of the casing and having a port for communication with the lubricant reservoir and a spring actuated valve extending within the cylinder and normally engaging the valve seat and means extending from the valve within the cylinder for engagement by the piston, whereby a predetermined quantity of lubricant will be admitted to the cylinder from the reservoir.

2. The combination with a cylinder and a piston operating therein, of a lubricant reservoir, a valve casing located within the reservoir and having one end secured within an opening provided in the cylinder, a valve seat at the inner end of the casing and having a port for communication with the lubricant reservoir, a spring actuated valve extending within the cylinder and normally engaging the valve seat, means extending from the valve within the cylinder for engagement by the piston, whereby a quantity of lubricant will be admitted to the cylinder from the reservoir, said valve comprising a head, shank extending from head, a combined guide and adjusting sleeve surrounding the stem and a spring surrounding said stem between the head and sleeve.

In testimony whereof I affix my signature.

CLEMENS H. STEINBRECHER.